United States Patent [19]
Borchert

[11] Patent Number: 6,155,653
[45] Date of Patent: Dec. 5, 2000

[54] METHOD AND APPARATUS FOR PUMP ACTIVATION DURING ABS/TCS CONTROL

[75] Inventor: Detlev M. Borchert, Rochester Hills, Mich.

[73] Assignee: ITT Manufacturing Enterprises, Inc., Wilmington, Del.

[21] Appl. No.: 09/082,639

[22] Filed: May 21, 1998

[51] Int. Cl.[7] .................................................. B60T 13/68
[52] U.S. Cl. .................... 303/11; 303/116.1; 303/122.13; 303/DIG. 3
[58] Field of Search .............................. 303/10, 11, 116.1, 303/116.2, 115.4, 113.2, 122.09, 122.12, 122.13, DIG. 3, DIG. 4

[56] References Cited

U.S. PATENT DOCUMENTS

| | | | |
|---|---|---|---|
| 5,197,787 | 3/1993 | Matsuda et al. ............................ | 303/11 |
| 5,498,070 | 3/1996 | Inagawa et al. ............................ | 303/11 |
| 5,613,740 | 3/1997 | Kawamoto et al. ....................... | 303/11 |
| 5,788,337 | 8/1998 | Eckert ........................................ | 303/11 |
| 5,791,745 | 8/1998 | Sakakibara ................................. | 303/11 |

*Primary Examiner*—Matthew C. Graham
*Attorney, Agent, or Firm*—Rader, Fishman & Grauer PLLC

[57] ABSTRACT

A method and apparatus for controlling activation of a brake pump during controlled braking conditions include a controller for determining pump activation conditions based on four empirically obtained tables stored in the controller: a pressure series table, volume consumption table, pressure gradient table, and a pump output table. The four tables are used to determine when the brake pump is activated as well as at what capacity the pump should be operated in order to achieve optimal braking performance with least amount of driver discomfort.

10 Claims, 5 Drawing Sheets

METHOD AND APPARATUS FOR PUMP ACTIVATION DURING ABS/TCS CONTROL

FIELD OF INVENTION

The present invention is related to vehicle Antilock Braking and Traction Control System ("ABS/TCS"). More specifically, the invention is directed towards a method of brake fluid pump activation and a system for practicing therefor to increase the comfort level affected by the activation of the pump.

BACKGROUND OF THE INVENTION

It is a well known fact to physicists and engineers alike that a body in motion comes to a halt in a shorter distance when decelerated to a gradual stop as opposed to skidding. When the moving object is a vehicle, factors such as directional control and braking distance is negatively affected when the vehicle enters a skidding condition during braking. That is to say, directional control of the vehicle, i.e., steerability, is significantly reduced while braking distance, i.e., the distance needed to bring the vehicle to a complete stop, is significantly increased. Therefore, modem vehicle manufactures have incorporated ABS into the vehicle's normal braking system to prevent wheels from locking, i.e., preventing the vehicle from entering into a skidding condition, when the vehicle brakes are activated by the driver during conditions when skidding is most likely to occur, e.g., slippery road conditions, to allow the driver to retain directional control of the vehicle.

FIG. 1 shows an example of a typical braking circuit used by ABS/TCS. In a normal braking mode, the braking process is actuated when a driver applies steady pressure on brake pedal 20 causing the braking fluid in master cylinder 22 via vacuum boost 24 to travel through the brake circuit to press against brake pad 26 installed on wheel 28 to initiate deceleration of vehicle. Under normal road conditions, the frictional force created by the decelerating wheels against the road surface, i.e., traction, is greater than the frictional forces of the brake pads against each wheel such that the vehicle decelerates gradually without skidding. However, under slippery road conditions or in sudden braking conditions, the frictional force of the wheel pads on the wheels may be greater than the traction of the wheels on the road causing the wheels to lock and skidding to occur.

A typical antilock braking system includes a controller (not shown) which monitors, among other parameters, vehicle speed ($\upsilon_{vehicle}$) and wheel speed($\upsilon_{wheel}$) of each wheel. During operation of the vehicle, the ABS controller constantly compares $\upsilon_{wheel}$ with a reference speed ($\upsilon_{reference}$) $\upsilon_{reference}$ is a predetermined threshold of $\upsilon_{wheel}$, e.g., a percentage of $\upsilon_{vehicle}$, at which a wheel begins to approach the unstable area of a $\mu$-adhesion/slip curve as indicated by line $\lambda$ in FIG. 2 or as shown in FIG. 3. Under normal braking conditions, $\upsilon_{vehicle}$ and $\upsilon_{wheel}$ decelerate in substantially a linear manner such that $\upsilon_{wheel}$ of each wheel does not drop below $\upsilon_{reference}$ during the duration of the braking process, i.e., wheels do not lock. Therefore ABS is not activated during such a condition.

However, as shown in FIG. 2, if $\upsilon_{wheel}$ of a wheel drops below $\upsilon_{reference}$ during a braking process, it is likely that the monitored wheel is about to fall below the slip switching threshold $\lambda$, i.e., wheel lock. When such a condition is detected, the ABS controller takes control of the brake system in order to maintain the unstable wheel in the stable region of operation, i.e., prevent from lock up. As shown in FIG. 1, a typical antilock braking system includes pump assembly 30. When a tendency for wheel lock is detected on wheel 28, the ABS controller (not shown) actuates normally open ("NO") valve 32 to close (pressure hold) and normally closed ("NC") 34 valve to open (pressure dump). Depending on the pressure existing in the now isolated wheel brake circuit, ABS controller activates pump 30 to remove a certain amount of brake fluid from low pressure accumulator 36 thereby relieving brake pressure off of wheel 28 such that the wheel starts to re-accelerate again. By constantly comparing $\upsilon_{wheel}$ against $\upsilon_{reference}$, as well as other parameters, such as peripheral wheel acceleration or speed, the ABS controller activates and deactivates return pump 30 to control the amount of brake pressure on wheel 28 to prevent wheel lock during braking.

In a typical traction control system, the controller is constantly monitoring $\upsilon_{wheel}$ to $\upsilon_{reference}$ to control wheel slip similar to ABS. However, unlike ABS which detects wheel slip during deceleration of a vehicle, TCS detects wheel slip during acceleration of the vehicle. That is to say, the controller in TCS applies braking pressure to the slipping wheels as opposed to the controller in ABS which relieves braking pressure to the slipping wheels.

Under normal road conditions, the accelerating wheel transfers its force to accelerate the vehicle by virtue of traction of the wheel to the surface of the road. However, under wheel slip conditions, the acceleration force of the wheel is greater than the frictional force of the wheel on the surface of the road, i.e., low traction, resulting in a spinning wheel. In order to bring the slipping wheel into a stable operating condition, the TCS controller applies brake pressure to the slipping wheel to slow it down such that the frictional force of the wheel to the surface of the road, i.e., traction, is greater than the force of the spinning wheel allowing the wheel to transfer the acceleration force to the vehicle.

Typically, the controller of an ABS and the controller of a TCS are one in the same although dedicated controller for ABS and TCS may be used. Similarly, the pump that relives braking pressure in ABS mode may be used to provide braking pressure in TCS mode, although dedicated pumps may be used for ABS and TCS respectively. In either case, the activation of the pump is a major source of driver discomfort in the prior art systems.

The noise produced by the pump is so loud that many drivers are startled and disconcerted when the pumps are activated unless the driver is already familiar with ABS/TCS operations. Furthermore, when the motor activates and pumps the brake fluid during ABS/TCS control mode, the driver usually feels the brake pedal pulsing under his or her feet due to the brake fluid slamming against actuating valves in synchronization with the motor noise. Such an occurrence may distract the driver as well as cause psychological distress for fear of possible brake failure or some type of vehicle break down.

In addition, some prior art systems utilize a pressure sensor associated with the brake system to monitor the pressure in the brake circuit. However, some of these pressure sensors are sensitive to vibrations needing costly repairs to recalibrate or replace the pressure sensors. Furthermore, the cost of these pressure sensors themselves are expensive, driving up the cost of manufacturing of vehicles with this type of system.

SUMMARY OF THE INVENTION

Accordingly, the problems of the prior art is overcome by the present invention by providing a new and improved method of pump activation and a brake system for practicing the same. In accordance with the present invention, an apparatus for controlling activation of a brake pump during controlled braking conditions include a controller for determining pump activation conditions based on four empirically obtained tables stored in the controller: a pressure series table, volume consumption tables (1 per control channel), 3 or 4 pressure gradient tables, and a pump output table. A method of using the same includes the steps of detecting initiation of a controlled braking condition, determining desired fill state of a low pressure accumulator during the controlled braking condition based on a pressure series table, a volume consumption table, and a pressure gradient table, determining actual fill state of the low pressure accumulator, determining a difference between the desired fill state with the actual fill state, and activating the brake pump if the difference is more than a predetermined amount.

One advantage of the present invention is that the pump is activated only when it is required, i.e., minimizes the amount of time that the pump runs, thus eliminating the amount of time it runs needlessly. Alternatively, the pump speed is reduced such that the pump is not running at full speed when it is not necessary. The present invention takes advantage of the concept that as long as a pressure difference presides in the brake circuit, the fluid under pressure is dumped out of the wheel brake cylinder by itself via easiest opened valves. Further, the pressure level that has already been built up may be sufficient to reaccelerate the wheel and to continually control the same without having to activate the pump.

Another advantage of the present invention is that the pump is activated at a prescribed energy level sufficient to provide the necessary pressure, and no more. For example, if the system only needs 50% of the pump's maximum capacity to provide the necessary pressure, then only the energy needed to provide 50% capacity is sent to the pump. In this way, the "hammering" effect as well as noise level experienced by the driver is minimized.

Yet anther advantage of the present invention is that expensive pressure sensors are not needed to monitor the pressure in the brake circuit, although the present invention may be incorporated with dedicated pressure sensors if desired.

BRIEF DESCRIPTION OF DRAWINGS

The features and inventive aspects of the present invention will become more apparent upon reading the following detailed description, claims, and drawings, of which the following is a brief description:

DETAILED DESCRIPTION OF THE INVENTION

Figure 2:
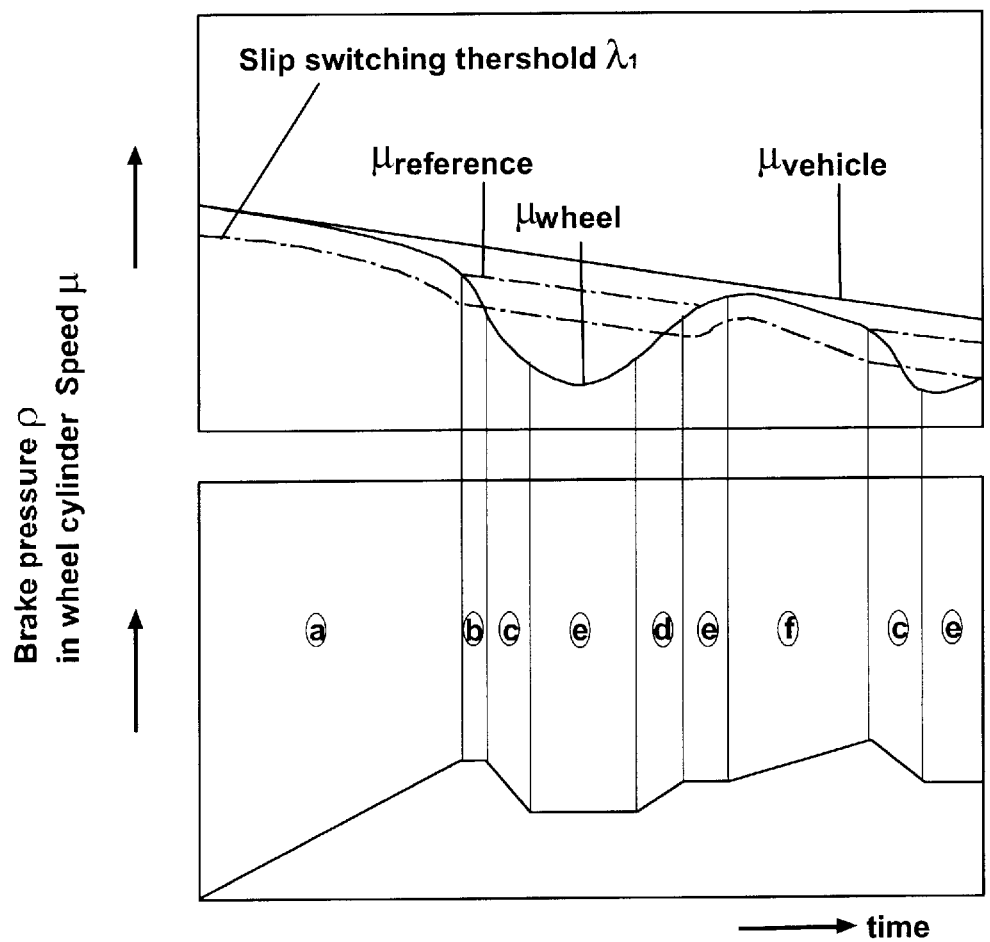
FIG. 2 is a graph showing the relationship of wheel speed and brake pressure during braking under slippery road conditions.

In accordance with the present invention, typical wheel speed traces for controlled braking maneuvers have been determined from vehicle dynamic performance calculations and from practical experiments as shown in FIG. 2. Based on this information, wheel speed trace can be divided up into regions in which the trace exhibits certain characteristics referred hereinafter as phases.

To determine the phases, instantaneous wheel acceleration and relative position of the wheel speed to the reference velocity are used. The brake torque changes are determined from the phase assignment and the current speed profile within the phase.

Six phases and their relation to the pressure modulation are defined below with reference to FIG. 2.

(a) Ph0: This phase identifies the state outside of controlled braking, i.e. unbraked or partially braked wheel. Pressure changes in the brakes occur normally without activation of the solenoid valves but strictly by means of the conventional braking system (vacuum booster and master cylinder only)

Figure 3:
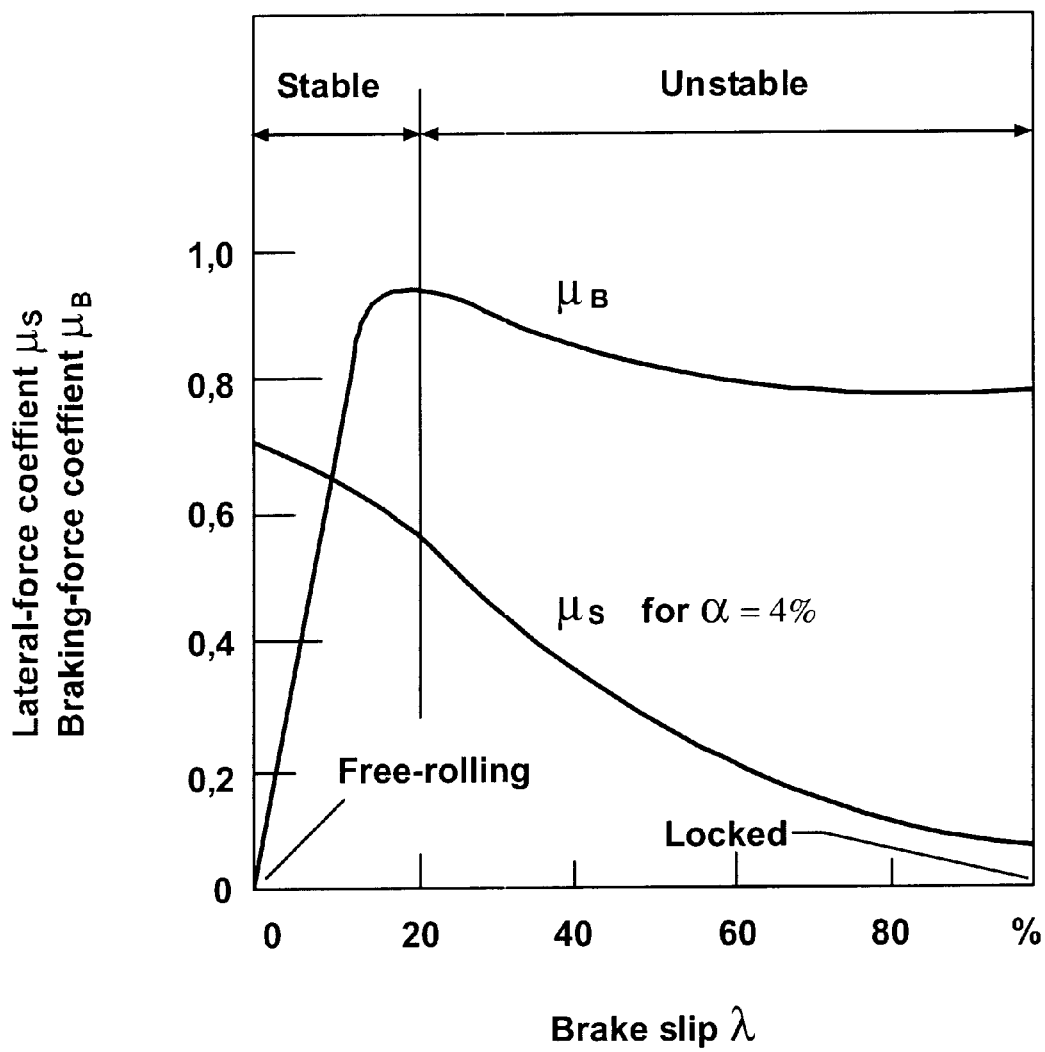
FIG. 3 is a typical $\mu$-adhesion/slip curve.

(b) Ph1: This phase identifies the time period during which the wheel speed behavior indicates that the wheel is about to enter the unstable area of the $\mu$-slip curve (FIG. 3), i.e., beginning to lock up. Therefore, pressure is generally held constant during this phase. This phase can occur outside of controlled braking or during controlled braking.

(c) Ph2: This phase identifies that the wheel is running in the unstable area of the $\mu$-slip curve, i.e., skidding. The wheel that tends to lock is released by decreasing the pressure to reaccelerate the wheel. The first occurrence of this phase (Ph2$i$) initiates the controlled braking process.

(d) Ph3: This phase identifies that the wheel is running in the stable area of the $\mu$-slip curve. Therefore, a pressure increase is initiated to begin deceleration of the wheel again.

(e) Ph4: This phase marks the transition from the unstable to the stable area within the control cycle. The pressure is usually held constant to determine whether the wheel is entering into (c), (d), or (f).

(f) Ph5: This phase identifies the time period during which the wheel speed is higher than the reference velocity. This phase can occur both outside or during controlled braking cycle. Pressure may increase or kept constant during this phase.

Furthermore, to differentiate between unbraked or partial braking conditions and controlled braking conditions, the terminology of a cycle is defined as follows:

Cycle 0 (CC=0) indicates the state outside of controlled braking.

Cycle 1 (CC=1) indicates controlled braking cycle initiated at Ph2$i$ as described above. Cycle 1 of a wheel is ended only when all four wheels have completed Ph3 or the vehicle comes to a complete stop.

As an example, if the state of a wheel is indicated as (CC=1, Ph3), that means pressure is being applied to the wheel during a controlled braking state because the wheel has just transitioned from an unstable condition, i.e., skidding, into the stable area.

Figure 4A:
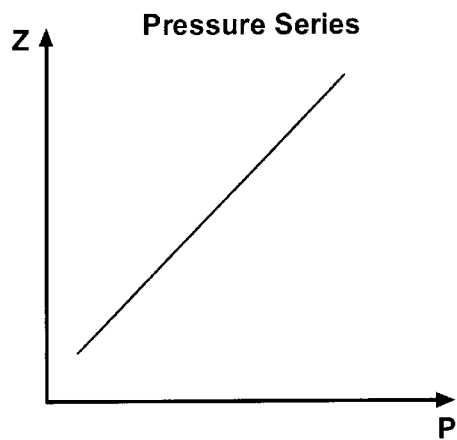
FIG. 4A is a principle of a pressure series table of the present invention.
Figure 4B:
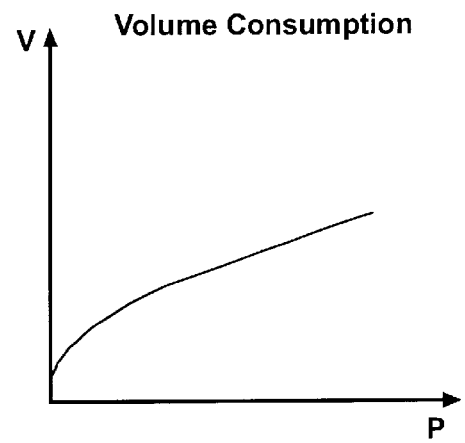
FIG. 4B is a principle of a volume consumption table of the present invention.
Figure 4C:
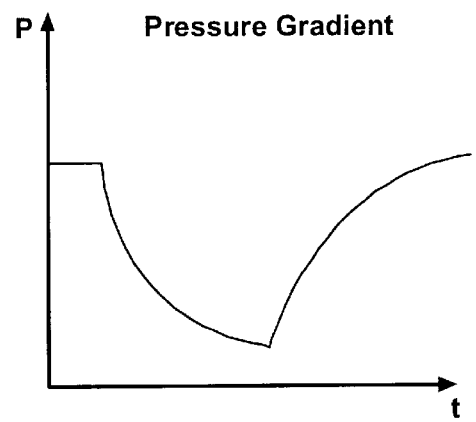
FIG. 4C is a principle of a pressure gradient table of the present invention.
Figure 4D:
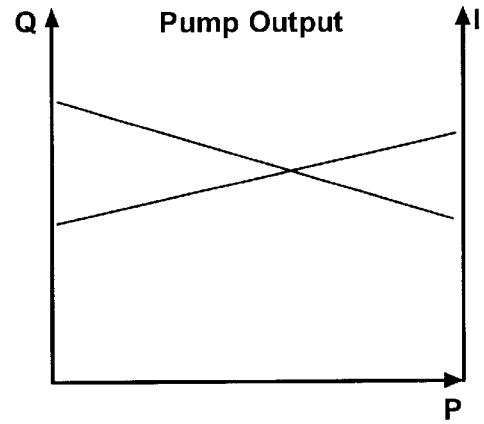
FIG. 4D is a principle of a pump output table of the present invention.

According to the method of the present invention, four types of characteristic curves as shown in FIGS. 4A–4D are used in determining pump activation. FIG. 4A is a pressure series table that indicates real vehicle deceleration in relation to line pressure. FIG. 4B is a volume consumption table that indicates volume of brake fluid consumed in relation to line pressure. FIG. 4C is a pressure gradient table indicating line pressure characteristic over time. FIG. 4D is a pump output table that indicates volume flow based on current or voltage supplied to the pump for a given line pressure. Data represented on each of these tables are obtained empirically for each vehicle platform and stored in the vehicle's brake controller. In this way, each vehicle has customized performance characteristic information thereby increasing reliability of the performance of each vehicle.

Figure 5:
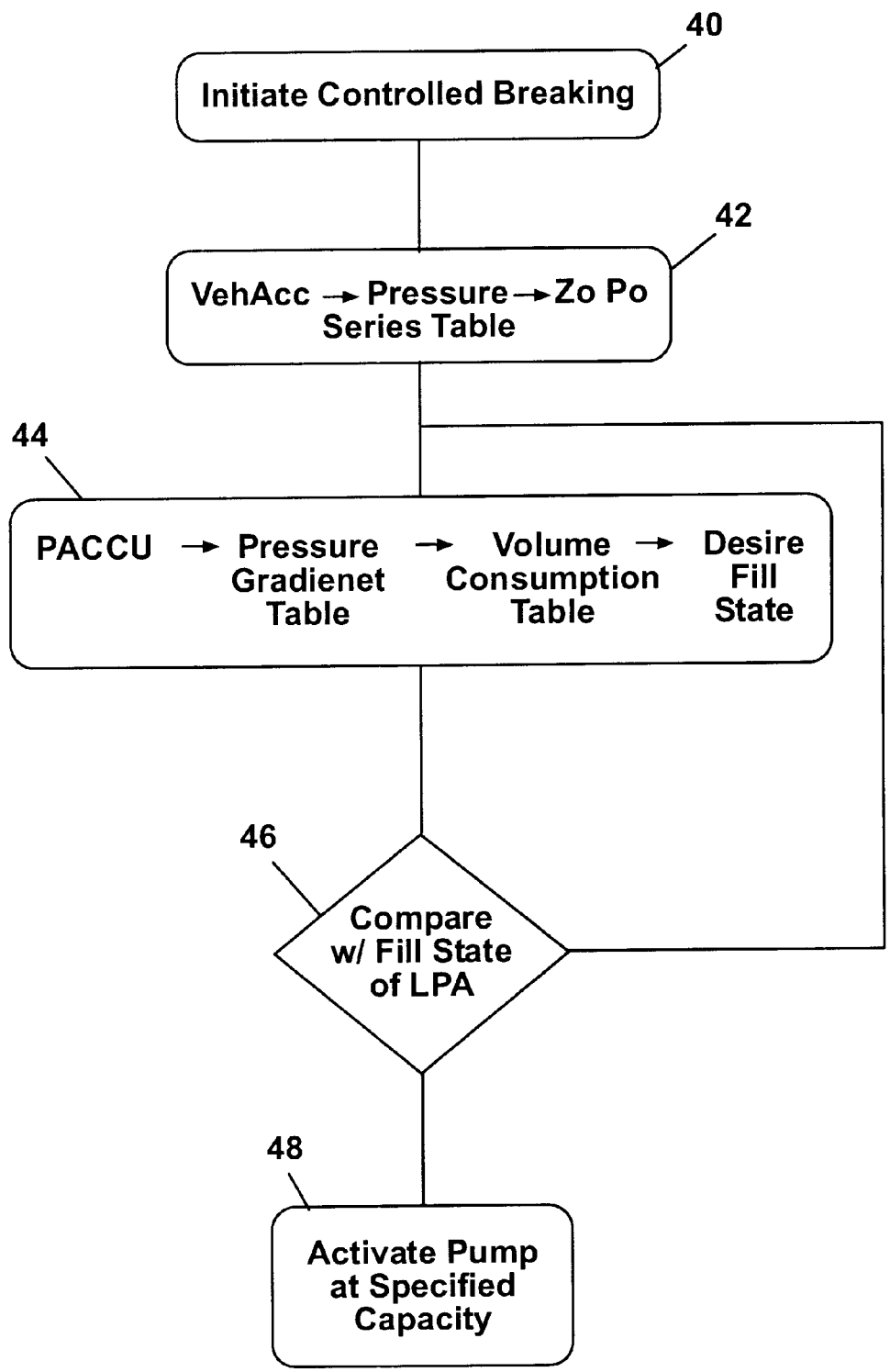
FIG. 5 is a flow diagram describing inventive method of the present invention.

The pump activation method according to the present invention will be described hereinafter with reference to FIG. 5. At the beginning of a controlled braking cycle (CC=1, Ph2$i$) in step 42, a VehAcc signal is used to obtain an estimate about the minimum locking pressure level using the pressure series table (FIG. 4A). Vehicle Acceleration signal ("VehAcc") consist of two basic signals VAC_FILT and VAC_DVDT. VAC_FILT signal is based upon filtered wheel acceleration signal of each wheel. VAC_DVDT is a signal generated out of values such as wheel speed of a non-driven wheel and the corresponding moment in definite time periods. If all the wheels are in controlled braking conditions, then VehAcc=VAC_DVDT. All other times, VehAcc=VAC_FILT. Both the VehAcc value and the corresponding pressure value ($Z_0$, $p_0$) are stored at the beginning of the controlled braking control cycle.

Figure 1:
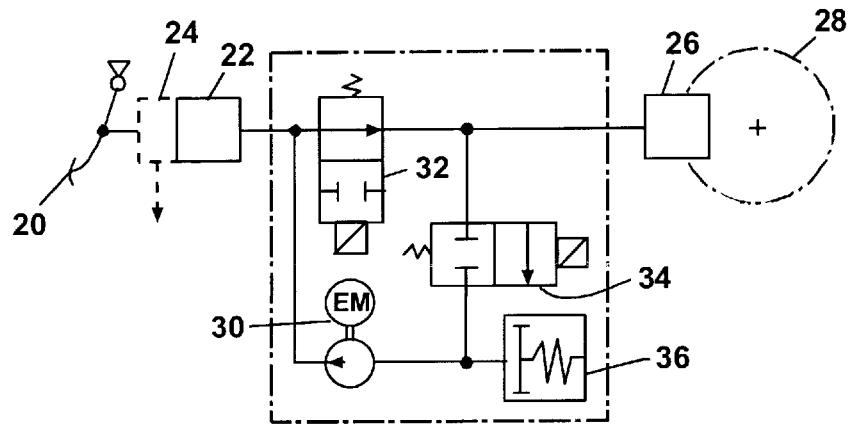
FIG. 1 is a schematic diagram of a typical ABS/TCS brake circuit.

In step 44, a pressure decrease time accumulator ("PACCU") of each control channel counts the pressure decrease time. PACCU is a counter in the control logic that counts every time cycle (e.g. millisecond) during the time NC valve 24 (FIG. 1) is activated. There is one counter per wheel. Furthermore, a control channel is defined as a brake circuit for each wheel or a predetermined set of wheels. For example, a vehicle may have three control channels where one control channel controls the front right wheel, another controls the front left wheel, and the last controls the two rear wheels. Another vehicle may have four control channels, each controlling a corresponding wheel. Still yet another vehicle may have more than four control channels, especially special vehicles having more than four wheels such as trailers. The method of the present invention may be adapted to any vehicle because the four types of characteristic tables are empirically obtained for each vehicle platform.

Each of PACCU's pressure decrease times are then converted to volumes using the pressure gradient table (FIG. 4C) and the volume consumption table (FIG. 4B) to be stored in a filling state of the low pressure accumulator. In step 46, based on the comparison between an adequate low pressure accumulator fill state obtained above and the actual fill state, pump 30 will be turned on for a time that fits the pump output characteristic curve (FIG. 4D).

By using the pump output table (FIG. 4D) and the pressure gradient table (FIG. 4C), pump 30 is activated in step 48 at the capacity level to provide the necessary pressure. That is to say, if only 50% capacity of the pump is necessary to provide the desired pressure, then only enough energy for the pump to run at 50% capacity is sent to the pump. In this way, unnecessary expenditure of energy is minimized while the feedback felt by the driver on the brake pedal is also minimized.

In addition the above described method of pump activation, the following safety features are also included to fully appreciate the advantages of the present invention. Firstly, an offset value is added to the pump activation time. Although minute, the lag time between when an activation signal is sent to the pump and the actual activation of the pump may cause undue delay in emptying the low pressure accumulator ("LPA"). This in turn may cause the pump to work harder than necessary if the pump actuated at the initially designated time.

Secondly, bad road conditions such as bumpy road conditions may activate the pump during ABS controlled braking unnecessarily because the wheels oscillate and "lock up" during the times when the wheels leave the ground. Furthermore, the oscillation of the locking condition may synchronize with the pump activation causing uncomfortable driving conditions for the driver. Therefore, calculated wheel oscillation detection signals are used to provide the brake controller with road condition information to minimize activation of the pump.

Thirdly, overshooting system pressure is compensated by measuring the control frequency, i.e., how many times ABS has been activated using PIPAC. Pressure increase pulse accumulator ("PIPAC") counts the pressure increase pulses during Ph3. The length of a stable phase, used in conjunction with other signals, is an indication of a change of the system pressure during an ABS stop. Furthermore, a Ph3$i$ counter counts the occurrence of Ph3$i$ of the front wheels. In the case of having only one wheel in Ph3 and the other in Ph0, e.g., in split-$\mu$ conditions, the count is doubled. In this way, Ph3$i$ counter is used on medium and low fiction conditions to get an estimate of the system pressure. Consequently, the count is high at high system pressure and low at low system pressure.

Figure 6:
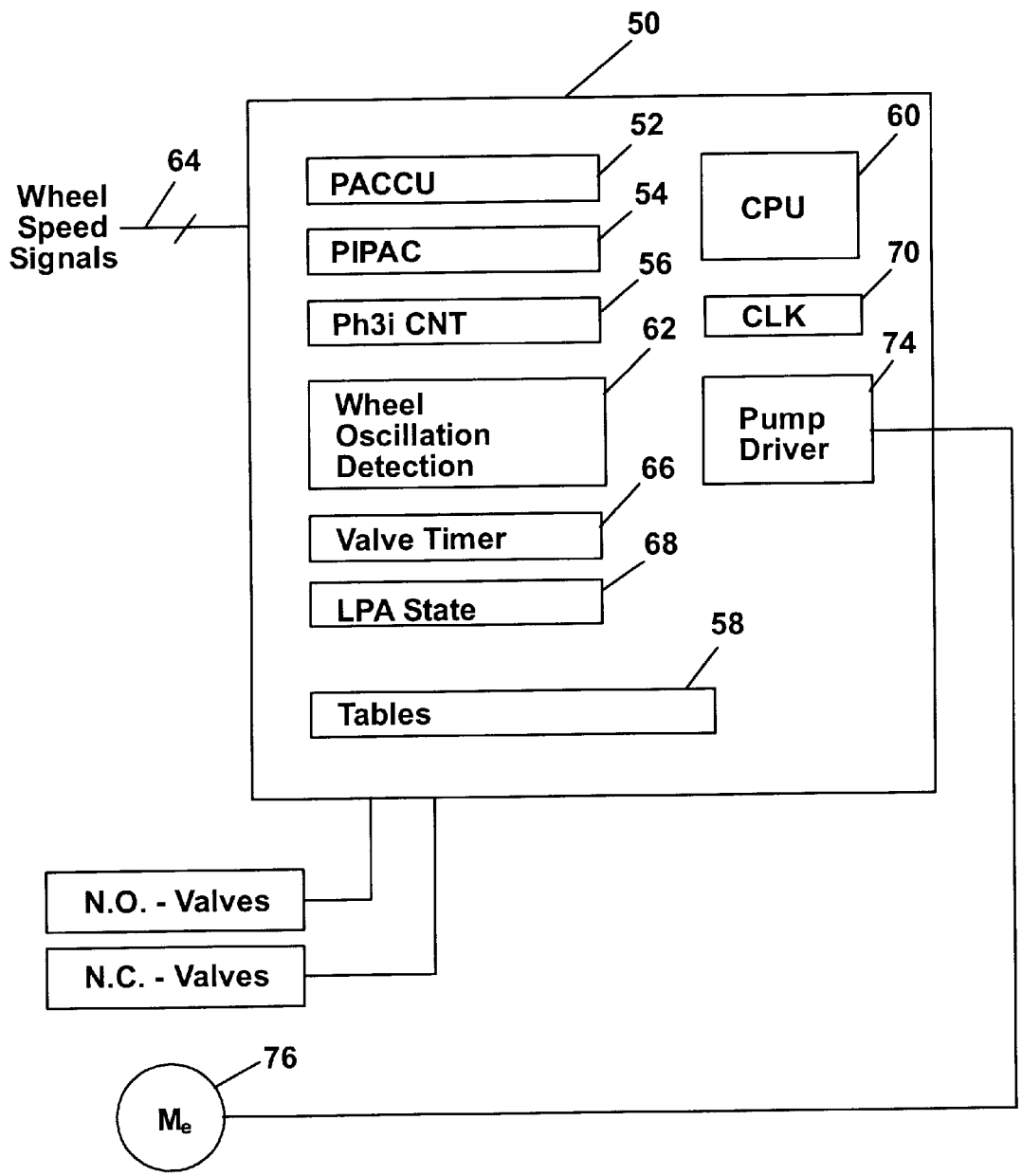
FIG. 6 is a schematic block diagram of a brake control system according to the present invention.

FIG. 6 shows a schematic block diagram of the brake controlling system of the present invention. References to elements shown in FIG. 1 will be made to describe the brake controlling system of FIG. 6. Brake controller 50 has therein PACCUs 52 for each control channel of a vehicle, PIPAC 54, Ph3$i$ counter 56, one valve actuation timer per control channel 66, a LPA register 68, a storage medium 58 such as random access memory ("RAM") for storing each of the characteristic tables (FIGS. 4A–4$d$) therein, and a central processing unit ("CPU") 60.

Lines 64 provide controller 50 with wheel speed signals from each of the wheel speed sensors (not shown) associated with each wheel of the vehicle. System clock 70 provides controller 50 with timing signals in order for PACCUs 50 to calculate the pressure decrease times.

Based on the wheel speed signals 64, CPU 60 determines the necessary conditions of the wheels to activate pump 30. Controller 50 then sends pump control signal 72 to pump driver 74. Pump driver 74 may be an analog or digital type, but digital is preferred. Based on signal 72, pump driver 74 then sends the indicated power to motor 76 to actuate the pump at the specified capacity.

In a TCS environment, the above method and apparatus is adapted to apply brake pressure to wheel 28 using pump 30 as oppose to relieving brake pressure. Therefore, the curves in FIG. 2 would be inverted to show acceleration of the wheels as opposed to deceleration. Further, the pressure series table and pressure gradient table as shown in FIGS. 4A and 4C would show acceleration instead of deceleration. Regardless, these characteristic tables for TCS control purposes are also obtained empirically for each vehicle and stored in storage medium 58 of controller 50.

Having fully described the preferred embodiments of the invention, variations and modifications may be employed without departing from the scope of the present invention.

Accordingly, the following claims should be studied to learn the true scope of the present invention.

What is claimed is:

1. A method of activating a brake pump in a controlled braking system of a vehicle, the steps comprising:

detecting initiation of a controlled braking condition;

determining a desired fill state of a low pressure accumulator during said controlled braking condition based on a pressure series table, a volume consumption table, and a pressure gradient table;

determining an actual fill state of the low pressure accumulator;

determining a difference between said desired fill state with said actual fill state; and activating the brake pump if said difference is more than a predetermined amount.

2. The pump activation method of claim 1, wherein said pump activating step further comprises the steps of:

determining a capacity of pump output using a pump output table; and running the brake pump at said capacity.

3. The pump activation method of claim 1, wherein said controlled braking system is an anti-lock braking system.

4. The pump activation method of claim 1, wherein said controlled braking system is a traction control system.

5. The pump activation method of claim 2, wherein said tables are obtained empirically.

6. A system for controlling activation of a pump in a controlled braking system of a vehicle comprising:

a wheel speed sensor for providing signals indicative of wheel speed;

a fill state signal indicative of an actual fill state of a low pressure accumulator;

a brake pump; and a brake controller having stored therein a pressure series table, a volume consumption table, a pressure gradient table, and a pump output table used in conjunction with said wheel speed signal and a pressure decrease time signal to determine a desired fill state of the low pressure accumulator, wherein said brake controller activates the brake pump when said desired fill state is different than said actual fill state, as indicated by said fill state signal, by a predetermined amount.

7. The pump activation control system of claim 6, wherein said controller further includes a pressure decrease time accumulator for providing said pressure decrease time signal.

8. The pump activation control system of claim 6, wherein said controlled braking system is an anti-locking brake system.

9. The pump activation control system of claim 9, wherein said controlled braking system is a traction control system.

10. The pump activation control system of claim 6, wherein said tables are obtained empirically.

* * * * *